United States Patent
Feng

(10) Patent No.: US 9,766,724 B2
(45) Date of Patent: Sep. 19, 2017

(54) ORIENTATION DEPENDENT STYLUS BUTTON FUNCTION

(71) Applicant: Lenovo (Singapore) Pte. Ltd., Singapore (SG)

(72) Inventor: Xin Feng, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/531,094

(22) Filed: Nov. 3, 2014

(65) Prior Publication Data

US 2016/0124528 A1    May 5, 2016

(51) Int. Cl.
    *G06F 3/033*      (2013.01)
    *G06F 3/0354*      (2013.01)
    *G06F 3/038*      (2013.01)
    *G06F 3/041*      (2006.01)

(52) U.S. Cl.
CPC .......... *G06F 3/03545* (2013.01); *G06F 3/038* (2013.01); *G06F 3/0383* (2013.01); *G06F 3/0416* (2013.01)

(58) Field of Classification Search
CPC ............... G06F 3/0317; G06F 3/03545; G06F 2200/1632; G06F 3/038; G06F 3/0383; G06F 3/0416; G06F 3/0482; G06F 3/04842; G06F 3/04883; G06F 3/0488; G06F 3/017; G06F 3/04817
USPC .......................................... 345/173, 179–181
See application file for complete search history.

(56) References Cited

U.S. PATENT DOCUMENTS

| | | | | |
|---|---|---|---|---|
| 7,646,379 B1 * | 1/2010 | Drennan | ............ | G06F 3/03545 178/18.01 |
| 2008/0225007 A1 * | 9/2008 | Nakadaira | ........... | G06F 3/04815 345/173 |
| 2012/0256831 A1 * | 10/2012 | Sakurai | ................ | G06F 3/0325 345/157 |
| 2013/0300719 A1 * | 11/2013 | Wang | ...................... | G06F 3/046 345/179 |
| 2014/0022218 A1 * | 1/2014 | Parekh | .................... | G06F 3/038 345/179 |
| 2014/0146021 A1 * | 5/2014 | Trethewey | ............ | G06F 3/0488 345/179 |
| 2014/0253521 A1 * | 9/2014 | Hicks | .................. | G06F 3/03545 345/179 |
| 2015/0009154 A1 * | 1/2015 | Shih | .................... | G06F 3/04883 345/173 |
| 2015/0220163 A1 * | 8/2015 | Leigh | .................... | G06F 3/0421 345/179 |
| 2015/0363035 A1 * | 12/2015 | Hinckley | .............. | G06F 3/0383 345/173 |

OTHER PUBLICATIONS

Wong, The Year of the Digital Pen, http://electronicdesign.com/blog/year-digital-pen, Mar. 8, 2013 (3 pages).
Microsoft, Surface Pro 3 User Guide, Version 1, Jun. 2014 (11 pages).

* cited by examiner

*Primary Examiner* — Duc Dinh
(74) *Attorney, Agent, or Firm* — Brian J. Pangrle

(57) ABSTRACT

A method can include detecting orientation of a stylus with respect to a display; and assigning a function to a button of the stylus based at least in part on the orientation where the function of the button can depend at least in part on an orientation angle of the stylus with respect to the display.

19 Claims, 10 Drawing Sheets

ORIENTATION DEPENDENT STYLUS BUTTON FUNCTION

TECHNICAL FIELD

Subject matter disclosed herein generally relates to styli for devices.

BACKGROUND

Various types of devices may include a stylus, for example, to facilitate input.

SUMMARY

A method can include detecting orientation of a stylus with respect to a display; and assigning a function to a button of the stylus based at least in part on the orientation. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
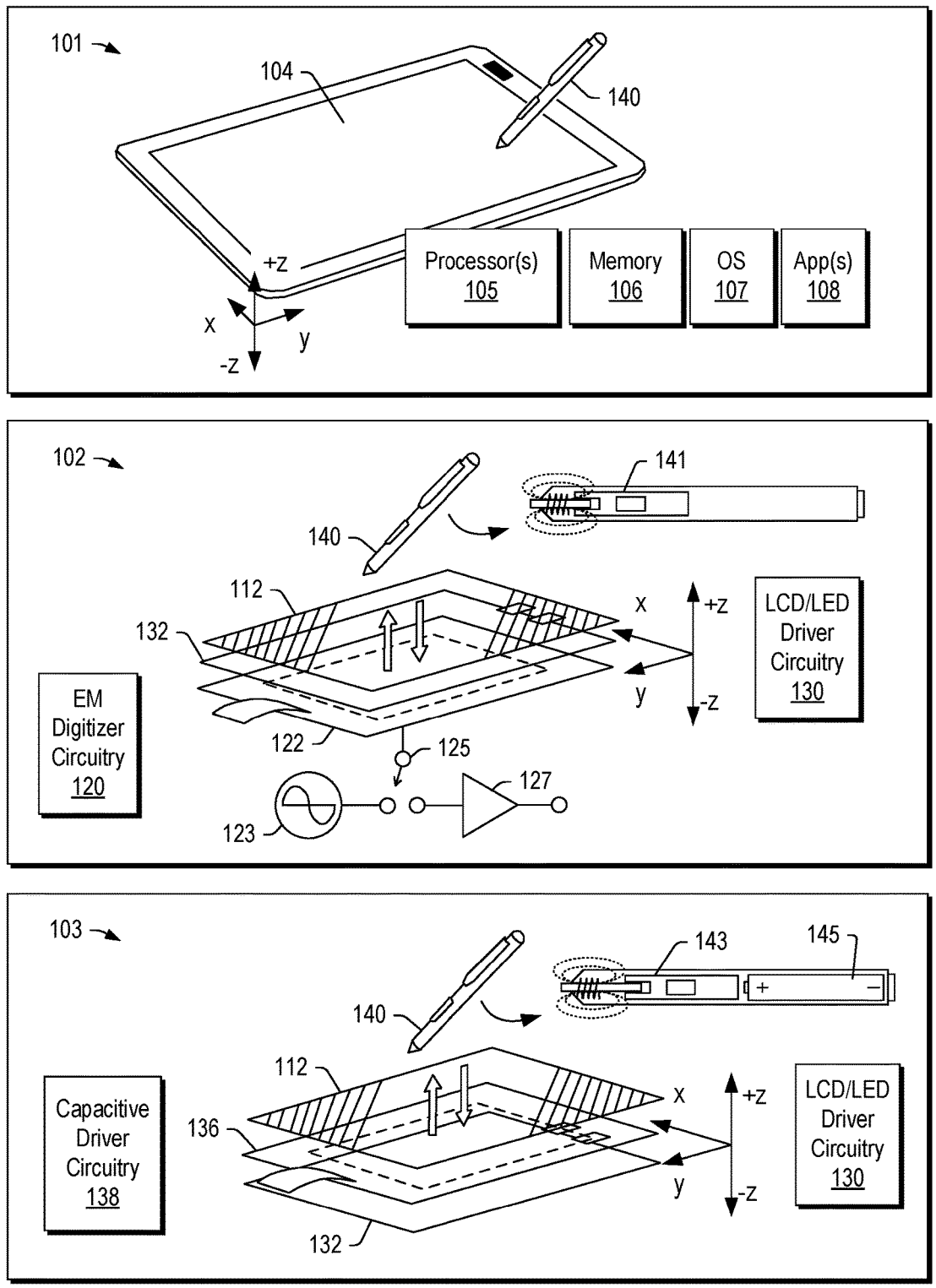
FIG. 1 is a series of diagrams of an example of a device and examples of arrangements of components.

FIG. 1 shows an example of a device 101 and examples of arrangements of panels 102 and 103 that may, for example, be included in the device 101. Each of the arrangements 102 and 103 is shown along with a Cartesian coordinate system that includes x, y and z axes. Various features of the device 101 and the arrangements 102 and 103 may optionally be described with respect to the Cartesian coordinate system. For example, length (e.g., along a y-axis), width (e.g., along an x-axis), depth (e.g., along a z-axis), aspect ratios, relationships between features, etc. may be described with respect to the Cartesian coordinate system.

In FIG. 1, the device 101 includes a display 104, one or more processors 105, memory 106, an operating system 107 (e.g., or operating systems) and one or more applications 108. In the example of FIG. 1, a stylus 140 may be used to input information such as, for example, commands, selections, digital ink, etc. As an example, an operating system environment may be established by executing instructions of the operating system 107 stored in the memory 106 of the device 101 using at least one of the one or more processors 105. In such an example, the operating system environment 107 may call for rendering information to the display 104, receiving and processing input via a surface (e.g., a surface of the display 104) using a stylus (e.g., the stylus 140), etc. As an example, an application may be executable in an established operating system environment, for example, to provide for drawing, handwriting recognition, photo editing, etc. through, in part, use of a stylus.

In FIG. 1, the example arrangement 102 includes a panel 112, an electromagnetic digitizer panel 122, the stylus 140, electromagnetic digitizer circuitry 120, an LCD and/or LED panel display 132 with associated driver circuitry 130. While LCD may be an acronym for "liquid crystal display", LCD finds uses as "LCD display", for example, as an adjective for "display" (e.g., a type of display). LED is an acronym for "light emitting diode". As an example, a display may include a panel that includes LEDs (e.g., an LED panel display).

In the arrangement 102, the panel display 132 is disposed at least in part between the panel 112 and the electromagnetic digitizer panel 122. In such an example, fields are transmitted through the panel display 132.

In the arrangement 102, as an example, energy may be induced in resonant circuitry 141 of the stylus 140 by a field generated by the electromagnetic digitizer panel 122. The resonant circuitry 141 of the stylus 140 may then make use of this energy to return a signal to the electromagnetic digitizer panel 122 where input signals may determine, for example, one or more of coordinate position, angle, speed, writing pressure, etc. As shown in FIG. 1, circuitry may be configured to switch a field on and off and to receive input signals. For example, the EM digitizer circuitry 120 may include or be operatively coupled to a high frequency source 123, a transmission and reception switch 125 (e.g., a coil switch) and a receiver 127.

As an example, an electromagnetic digitizer panel may include a sheet manufactured from glass epoxy resin or from a polyimide and PET formed film in which a large number of overlapping loop coils are arranged in a matrix in the x and y axis directions.

As an example, the circuitry 120 may discharge alternating current to selected loop coils from among the array of the electromagnetic digitizer panel 122 to excite the coils, causing them to generate fields. When the stylus 140 passes through these fields, it may pick up and store energy in its resonant circuitry 141. As an example, the circuitry 120 may detect an approximate location of the stylus 140, for example, by scanning the loop coils, which may include scanning multiple loop coils in the vicinity of approximate location of the stylus 140 to determine coordinate values more precisely.

In the arrangement 102, a location of the stylus 140 may be determined, for example, where the stylus 140 may be positioned a short distance from the electromagnetic digitizer panel 122 (e.g., an effective operational distance).

As an example, the circuitry 120 may include a digital signal processing (DSP) circuit for processing input. As an example, the circuitry 120 may be operatively coupled to a processor of a device (e.g., CPU, etc.). As an example, the circuitry 120 may include a DSP circuit and be operatively coupled to a processor of a device such as one of the one or more processors 105 of the device 101.

In FIG. 1, the example arrangement 103 includes a panel 112, an LCD and/or LED display panel 132 and associated driver circuitry 130 as well as an active capacitive panel 136, associated driver circuitry 138 and a stylus 140.

As shown in the arrangement 103, the stylus 140 can include circuitry 143 and a power source 145 (e.g., a battery). As an example, a stylus with a power source may optionally be implemented for the arrangement 102. Where a stylus includes a power source, the stylus may optionally include circuitry such as, for example, BLUETOOTH™ circuitry where signals may be communicated to a device that includes BLUETOOTH™ circuitry (e.g., the device 101 may include BLUETOOTH™ circuitry).

In the arrangement 103, the panel 136 can include translucent (e.g., "transparent") circuitry, for example, consider a panel that include circuitry formed at least in part of indium-tin-oxide (ITO). In such an example, visible electromagnetic emissions of the display panel 132 (e.g., as rendered via circuitry of the device 101) may be readily seen through the panel 136.

As an example, the panel 136 can include sensors that can sense changes in electrical current generated by proximity of an object such as a finger of a hand, an object that can cause changes in electrostatic capacity (e.g., load), etc. Such sensors may respond to presence of static electrical capacity of a finger as it approaches the panel. As an example, the panel 136 may include one or more types of circuitry. For example, consider surface capacitive circuitry and/or projective capacitive circuitry.

As an example, a panel can include drive electrodes and receive electrodes. In such an example, charge may be provided to the drive electrodes such that electric fields are formed with respect to the receive electrodes. The electric fields may be referred to as a "projected" electric field (e.g., projected capacitance of "p-cap").

As an example, a projected electric field may be available for "field coupling" by introduction of a conductive object (e.g., a hand, a stylus, etc.). For example, a portion of a projected electric field may couple with a conductive object, which leaves a remaining portion of the projected electric field coupling with one or more receive electrodes. In such an example, the field coupling with the conductive object acts to reduce charge collected by a receive electrode or receive electrodes. In turn, the collected charge may be used as an indicator of the conductive object being at or near a particular surface location on the panel (e.g., a particular x,y location in an x,y-plane).

As to techniques for measuring collected charge, as an example, an integrator may be implemented that integrates collected charge with respect to time. In such an example, drive electrodes may be driven using time pulses (e.g., regular approximately square wave pulses). Such a technique may act to help discriminate touches from noise, etc. As an example, a change in collected charge may be deemed a change in capacitance, for example, as a conductive object may introduce parasitic capacitance to circuitry of a touchscreen.

As an example, the panel 136 may include a conductive layer etched to form an x-y grid that can be driven by, for example, drive lines (e.g., running along the y direction) and where sensing may occur along sense lines (e.g., running along the x direction).

In such an example, the panel 136 may include mutual capacitive sensors (e.g., a capacitor at each intersection of each row and each column). As mentioned, charge (e.g., voltage) may be applied to the drive lines such that bringing a conductive object near one or more of the capacitive sensor changes the projected electric field in a localized manner that reduces mutual capacitance. For example, the capacitance change at individual points on a grid may be measured to determine a touch location (e.g., or touch locations) by measuring voltage (e.g., collected charge).

A mutual capacitance method may include providing drive electrodes and receive electrodes organized as a matrix (e.g., an array) and measuring capacitive coupling at points in the matrix, which, in turn, in the presence of a touch or touches, may act to locate the touch or touches with respect to the matrix.

As to the circuitry 138, in the example of FIG. 1, it may include a signal source operatively coupled to the drive lines of the panel 136, a multiplexer operatively coupled to the sense lines of the panel and an analog-to-digital converter (ADC), for example, to convert sensed analog signals of the sense lines received via the multiplexer to digital signals. As an example, the circuitry 138 may include digital signal processing (DSP) circuitry that can receive digital signals and provide output based at least in part on digital signal processing. As an example, DSP circuitry may receive an output array from the circuitry 138 where values in the array represent capacitance at, for example, x-y intersections of a mutual capacitance grid of the panel 136.

As mentioned, the stylus 140 may include the power source 145. In such an example, the circuitry 143 may emit an electrostatic signal (e.g., or other signals) that can be sensed by sense lines. For example, the circuitry 143 may include one or more antennas (e.g., coils, etc.) that can emit an electrostatic signal (or electrostatic signals). As an example, a junction or junctions of drive and sense lines (e.g., intersections of rows and columns) may receive signals emitted by the circuitry 143 of the stylus 140, which may be correlated to position of the stylus 140. Such an approach may be referred to as an "active capacitive" approach as the stylus 140 is "active" in that it can emit an electrostatic signal as generated at least in part via energy from the power source 145.

As an example, a stylus that includes a power source may include circuitry that can emit signals where one or more parameters of the signals may differ. In such an example, a particular signal may correspond to a command, for example, received and processed by a device such as the device 101 of FIG. 1. As an example, a stylus may include one or more buttons that may be actuatable (e.g., depressible, etc.) to cause circuitry of the stylus to emit a particular signal. As another example, consider a nib of a stylus that can respond to pressure upon contact of the nib with a surface. In such an example, the stylus may emit one or more signals that carry pressure information (e.g., how much pressure is being applied to the nib).

As an example, an active capacitive digitizer may be operative via circuitry that can also sense touch (e.g., a human finger, etc.). For example, an active capacitive digitizer may operate via drive and sense lines that can also be implemented to sense touch. In the arrangement 102, where touch sensing is desired, another panel may be included, which may increase device size, weight, etc.

As an example, a device may be operable in conjunction with an electrostatic stylus that may not include a power source and/or may be operable in conjunction with an electrostatic stylus that may include a power source (e.g., one or more batteries).

As an example, a stylus may include a conductive capacitor that can receive energy emitted by an electromagnetic field of a device (e.g., via an excitation coil, etc.). In such an example, one or more frequencies (e.g., of electromagnetic waves) may be controllable via a device. As an example, such a stylus may be considered to be a parasitic stylus as it derives its power from being in proximity to a device that emits electromagnetic energy.

As an example, a stylus may include a power source (e.g., one or more batteries). As an example, such a stylus may be considered to be an active stylus as it derives its power at least in part from an internal power source (e.g., an electrochemical power source). As an example, circuitry of a device may identify position of a stylus based at least in part via emissions of the stylus where such emissions are powered by a power source of the stylus. In such an example, the stylus may emit energy as to one or more other types of "information". For example, where a stylus includes a nib that can be pressed against a surface, the nib may be operatively coupled to a pressure circuit that may sense pressure, displacement, etc. In such an example, the stylus may emit energy that carries "pressure" information (e.g., a pressure level, etc.).

As an example, a stylus may include one or more buttons. As an example, a stylus that includes a power source (e.g., one or more batteries) may include one or more buttons. In such an example, a button may be actuated to cause circuitry powered by the power source to emit energy. Such energy may be sensed by a device and, for example, be processed as a command. As an example, a command may call for performing a function by the device. In such an example, the button may have a dedicated function. As an example, a function of such a button may be fixed (e.g., fixed via circuitry, optionally "hardwired", etc.) or may be assignable, for example, via a graphical user interface (GUI) that may be rendered to a display of a device. As an example, a function of a button may be assignable based at least in part on an orientation of a stylus. For example, a function of a button may depend on orientation of a stylus with respect to a device. In such an example, a function of a button of a stylus may change automatically in response to detection of a change in orientation of the stylus with respect to a display of a device.

As an example, button circuitry may assign a function based at least in part on orientation of a stylus with respect to a display of a device (e.g., via orientation circuitry of a stylus, a device or a stylus and a device). For example, a stylus may include button circuitry that receives information indicative of orientation of the stylus with respect to a display of a device and that assigns one of a plurality of functions to a button based at least in part on the received information. As an example, button circuitry may include a data structure such as a table. For example, consider a table that includes a first function associated with a first orientation and a second function associated with a second orientation. As an example, a data structure may include functions for a button or for buttons (e.g., for button IDs, a data structure may include functions for particular orientations).

Figure 2:
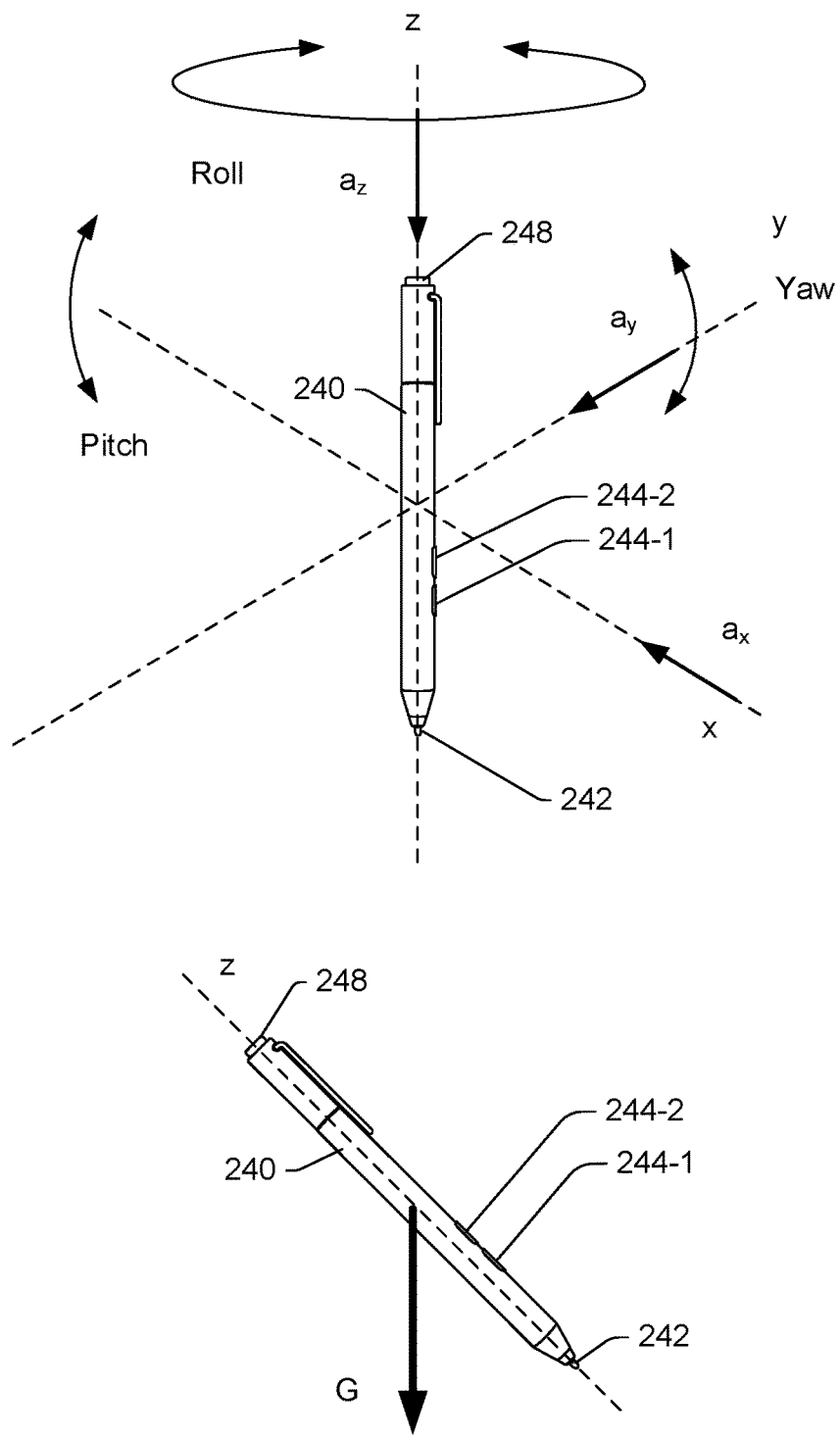
FIG. 2 is a diagram of an example of a coordinate system with respect to a stylus and an example of gravity with respect to an orientation of a stylus.

FIG. 2 shows an example of a stylus 240 that includes a nib 242, side buttons 244-1 and 244-2 and an end button 248. As illustrated, the stylus 240 may be substantially cylindrical with a longitudinal axis z. One or more features of the stylus 240 may define additional axes x and y. For example, circuitry in the stylus 240 may define an x,y-plane where the longitudinal axis z is normal to the x,y-plane. As an example, the stylus 240 may optionally be defined with respect to gravity. For example, a direction of the acceleration of gravity G is illustrated with respect to a point on the stylus 240 in FIG. 2. As an example, a stylus may include a cross-section that may be other than circular. For example, consider an oval cross-section, a polygonal cross-section, etc. As an example, a stylus may be defined as including a shaft with a nib end and a butt end.

In the example of FIG. 2, the stylus 240 may be defined with respect to various degrees of freedom. For example, consider six degrees of freedom of movement of a stylus in a three-dimensional space. In such an example, the stylus can be free to move forward/backward, up/down, left/right (e.g., translation in three perpendicular axes) combined with rotation about three perpendicular axes, which may be referred to as pitch (x-axis), yaw (y-axis) and roll (z-axis).

As an example, a coordinate system may be fixed and/or variable. For example, a coordinate system may be fixed with respect to a longitudinal z-axis of a stylus while optionally being variable as to an x-axis and a y-axis. For example, consider rotation of an x,y-plane about the longitudinal z-axis. In such an example, an x,y-plane may be "fixed" to an orientation of a device (see, e.g., the device 101 of FIG. 1). Thus, rotation of such a stylus about its z-axis (e.g., roll) may not alter an x,y-plane or, in other words, a device may define at least in part an x,y-plane while a stylus defines a z-axis in relationship to that x,y-plane. As an example, an x,y-plane of a device may be oriented based on orientation of the device. For example, a y-axis may be oriented to run from bottom to top for a portrait orientation and from bottom to top for a landscape orientation while an x-axis may be oriented to run from left to right for a portrait orientation and from left to right for a landscape orientation.

Figure 3:
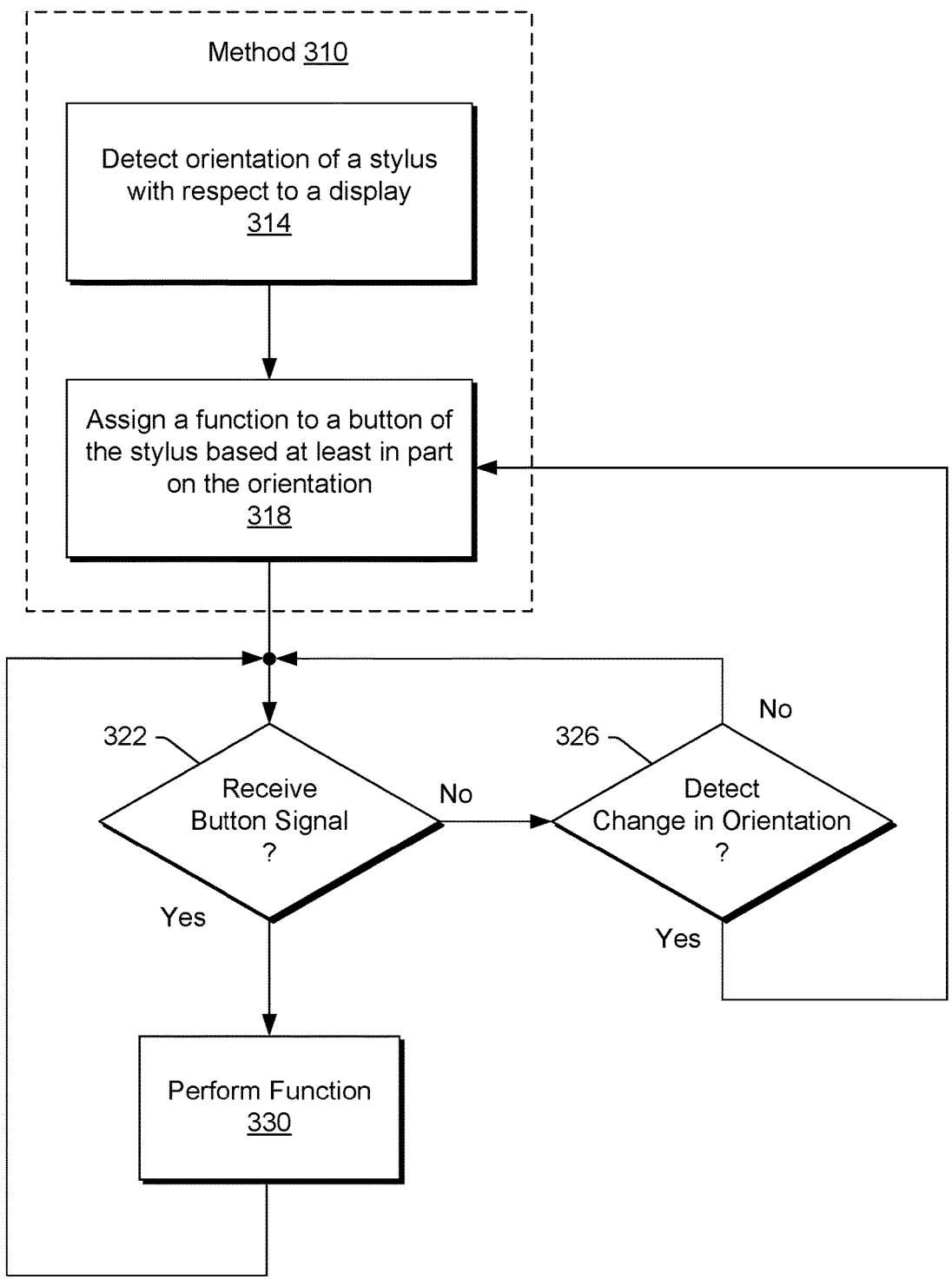
FIG. 3 is a diagram of an example of a method.

FIG. 3 shows an example of a method 310 that includes a detection block 314 for detecting orientation of a stylus with respect to a display; and an assignment block 318 for assigning a function to a button of the stylus based at least in part on the orientation.

As an example, the method 310 may include one or more additional blocks. For example, consider a decision block 322 for deciding whether a button signal is received. In such an example, where the decision block 322 decides that a button signal is received, the method 310 may continue to a performance block 330 for performing the function assigned to the button that generated the received button signal. As shown, where the decision block 322 decides that a button signal is not received, the method 310 may continue to another decision block 326 for deciding whether a change in orientation of the stylus has been detected. If so, the method 310 may continue to the assignment block 318 for assigning, as appropriate, a function to the button (e.g., and/or optionally to one or more other buttons). As shown in the example of FIG. 3, loops may exist that cause the method 310 to monitor for receipt of signals. For example, as to such loops, the performance block 330 may continue to the decision block 322 and the decision block 326 may continue to the decision block 322.

As an example, a signal may be "positive" and/or "negative". For example, consider a button that in a first state does not transmit a signal and that in a second state transmits a signal. In such an example, circuitry may receive a signal upon a transition from the first state to the second state and such circuitry may be considered, for example, to receive a signal upon a transition from the second state to the first state (e.g., a transition from a signal to an absence of the signal may be considered to be a signal received by the circuitry). As an example, actuation of a button may generate a change in state. For example, applying pressure to a physical button (e.g., in a downward direction, a sliding direction, etc.) may cause a change in state and release of pressure may cause a change in state. As an example, holding a button down for a period of time may cause a button to perform a function. For example, consider a select function of a button of a stylus responsive to an initial actuation signal generated by applying pressure to the button and a drag function where the button is held down while moving the stylus. As an example, one or both of such functions may depend on orientation of the stylus with respect to a display of a device.

Figure 4:
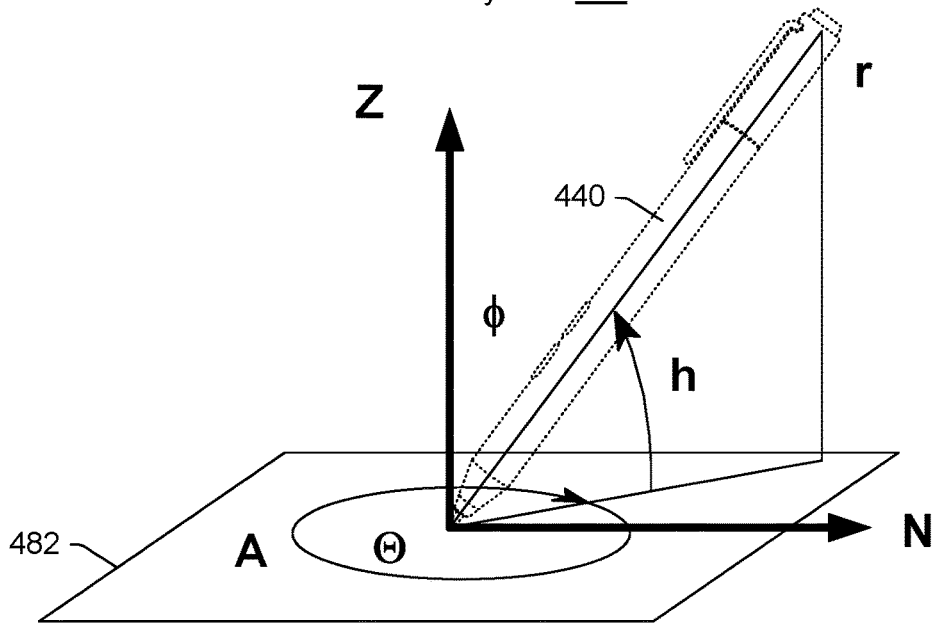
FIG. 4 is a series of diagrams of an example of a stylus with respect to an example of a coordinate system.
Figure 4:
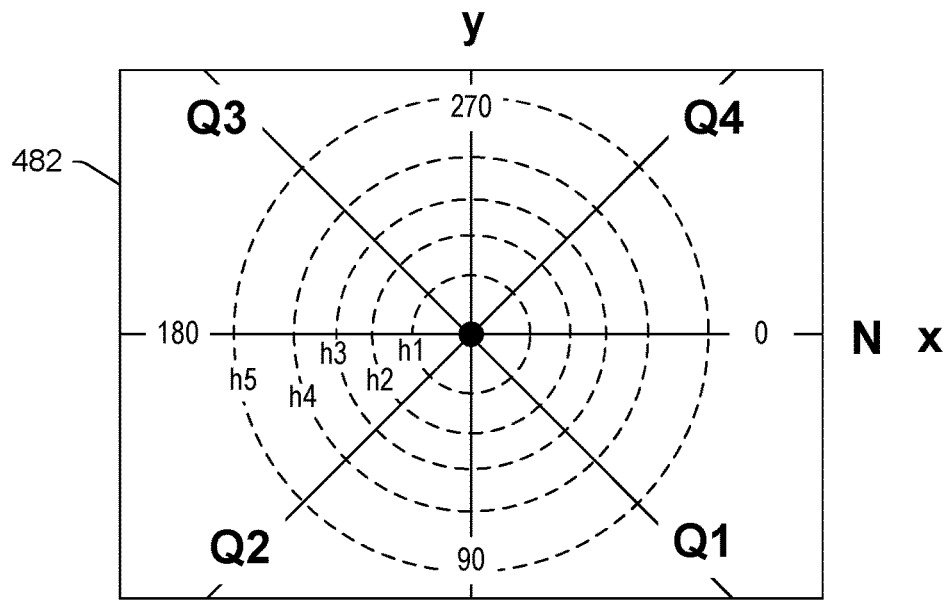

FIG. 4 shows an example of a stylus 440 in a coordinate system 480. As shown in FIG. 4, the coordinate system 480 may be a spherical coordinate system (e.g., spherical polar coordinates) or, for example, a hemispherical coordinate system (e.g., consider a sphere intersected by a plane).

Spherical coordinates can form a system of curvilinear coordinates that can describe positions on a sphere or spheroid. As an example, a coordinate system may define Θ to be the azimuthal angle in an xy-plane from the x-axis with an azimuthal angle range from zero to 2π (e.g., 360 degrees), define φ to be the polar angle (also known as the zenith angle and colatitude, with φ=90 degrees-delta where delta is the latitude) from the positive z-axis with a polar angle range from zero to π, and define r to be distance (e.g., radius) from a point to the origin. Another angle, referred to as the altitudinal angle h (e.g., elevation angle), may be defined as 90 degrees minus the polar angle φ.

In the example of FIG. 4, the coordinate system 480 may be viewed with respect to a plane 482. As an example, a surface of a device may define the plane 482. For example, a surface of a panel may define a plane such as the plane 482 (see, e.g., the device 101 of FIG. 1).

As shown in FIG. 4, the plane 482 may be organized into quadrants (e.g., Q1, Q2, Q3 and Q4) or a number of other types of areas. As an example, concentric rings may be defined (e.g., about an origin) that correspond to altitudinal angles. For example, where the stylus 440 is at a steep altitudinal angle, a projection of the stylus 440 onto the plane 482 may extend a distance from the origin to a ring. As to the origin, as an example, it may be movable with a nib 442 of the stylus 440. For example, the nib 442 of the stylus 440 may upon close proximity and/or contact with a device may define an origin of a coordinate system such as the coordinate system 480 of FIG. 4. As an example, the plane 482 may be determined at least in part by an orientation of a device (e.g., as to a right hand side and a left hand side).

As an example, a method may include determining a handedness based at least in part on the orientation of a stylus with respect to a display. For example, in a normal writing orientation, a right-handed user may orient a stylus such that a nib is in contact with a surface of a display and a butt end is oriented toward a lower right corner of the display (see, e.g., the quadrant Q1 of the plane 482 of FIG. 4); and a left-handed user may orient a stylus such that a nib is in contact with a surface of a display and a butt end is oriented toward a lower left corner of the display (see, e.g., the quadrant Q2 of the plane 482 of FIG. 4). As an example, a method can include selecting a range of azimuthal orientation angles based at least in part on the handedness. For example, orientations of the stylus 440 in the quadrant Q1 of the plane 482 may be considered to be "normal" for a right-handed user and changes from that quadrant may be considered indicative of the user intentionally changing orientation of the stylus 440 to change a function assigned to a button. And, for example, orientations of the stylus 440 in the quadrant Q2 of the plane 482 may be considered to be "normal" for a left-handed user and changes from that quadrant may be considered indicative of the user intentionally changing orientation of the stylus 440 to change a function assigned to a button. As an example, a "normal" orientation may be associated with a range of altitudinal angles. For example, a user may intentionally orient a stylus to be approximately perpendicular to the plane 482, which may cause a function of a button to change. In such an example, the stylus may remain in, for example, the quadrant Q1 but projected in a ring less than, for example, h2 or h1.

As an example, "normal" orientation for a right-handed user may be defined with respect to a range of azimuthal angles and a range of altitudinal angles and "normal" orientation for a left-handed user may be defined with respect to a range of azimuthal angles and a range of altitudinal angles where the ranges of altitudinal angles may be the same or approximately the same for both right-handed and left-handed users.

As an example, an orientation of a stylus with respect to a device may be independent of a position of a nib of the stylus with respect to a plane defined at least in part by the device. For example, orientation may be defined with respect to a movable origin that corresponds to a nib of a stylus. In such an example, the stylus may be rolled about its longitudinal axis without altering projected planar coordinates or a planar coordinate system. For example, orientation of a stylus may be defined by azimuthal angle and altitudinal angle or, for example, polar angle or a projected length of the stylus (e.g., a full length, a partial length, etc.).

Figure 5:
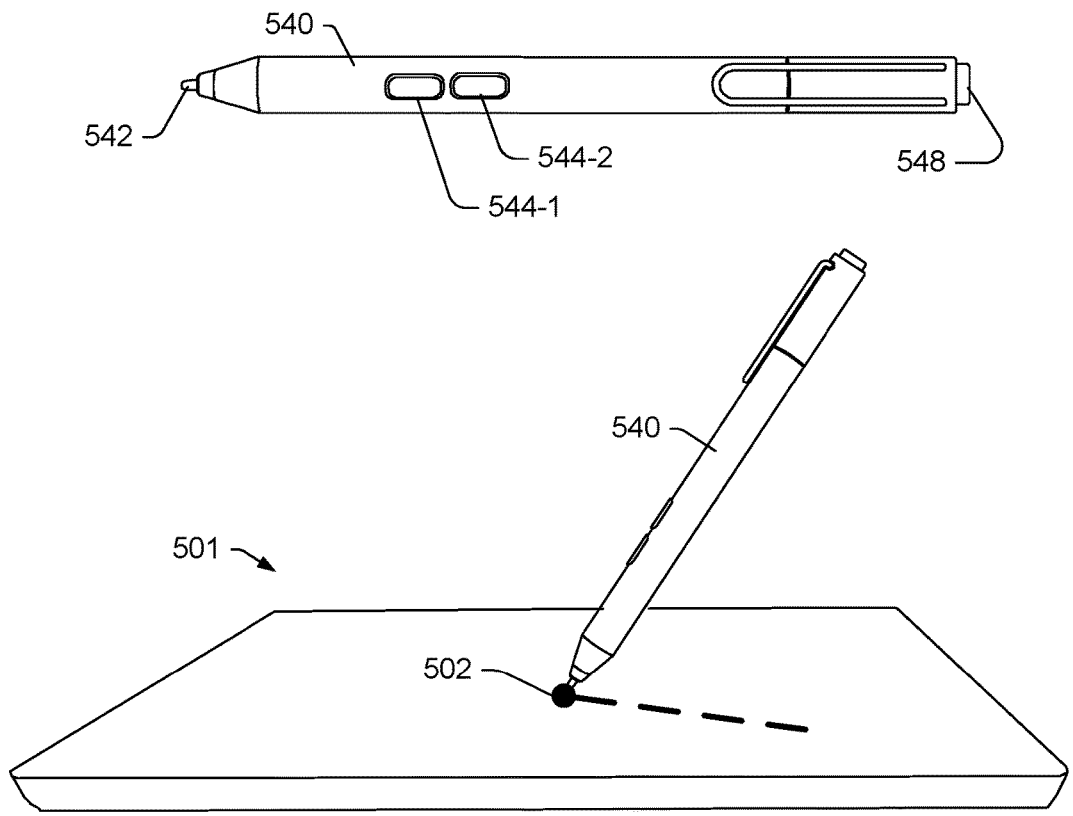
FIG. 5 is a series of diagrams of an example of a device, an example of a stylus and an example of a coordinate system.
Figure 5:
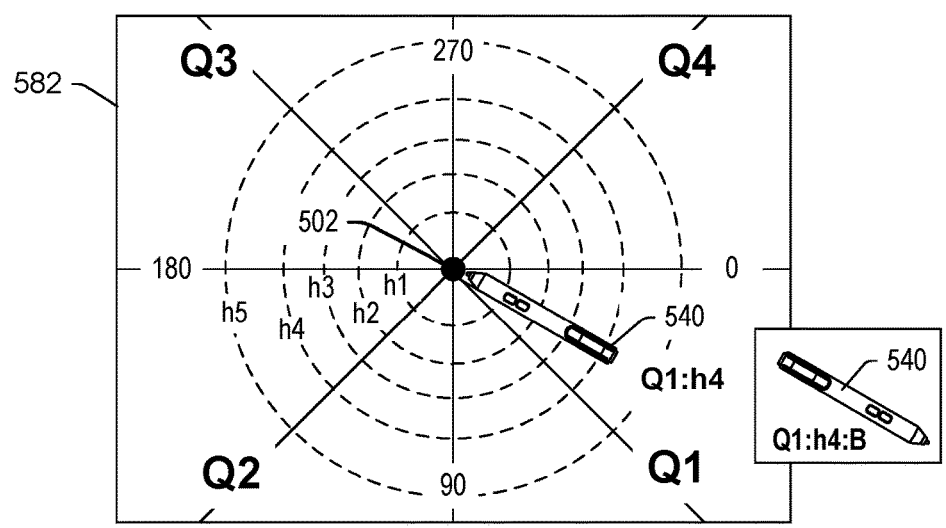

FIG. 5 shows an example of a stylus 540 that includes a nib 542, one or more side buttons 544-1 and 544-2 and a butt end button 548. In the example of FIG. 5, the stylus 540 is positioned and oriented with respect to a device 501 where the nib 542 defines an origin 502 of a coordinate system 580 that includes a plane 582. As shown, the stylus 540 is oriented in the first quadrant (Q1) with an altitudinal angle that corresponds to the ring h4 (e.g., as illustrated via a projection of the stylus 540 onto the plane 582). As an example, the device 501 may register the illustrated orientation as "Q1:h4". As an example, where the butt end of the stylus 540 is down (e.g., closer to the device 501 than the nib 542), the device 501 may register the orientation as "Q1: h4:B". For example, two orientations defined by an azimuthal angle and an altitudinal angle may be redundant with respect to ends of a stylus and, for example, a device, a stylus or a device and a stylus may be able to differentiate the two orientations (e.g., a nib down/nib up or butt end down/butt end up).

As an example, one or more of the buttons 544-1, 544-2 and 548 may be assigned a function based at least in part on orientation of the stylus 540 with respect to the device 501. As an example, a function may be one of a plurality of functions assignable to a button or buttons.

As an example, an orientation may be defined by an azimuthal angle. As an example, an orientation may be defined by an altitudinal angle (e.g., or a polar angle or a projected length). As an example, an orientation may be defined by an azimuthal angle and an altitudinal angle (e.g., or a polar angle or a projected length).

Figure 6:
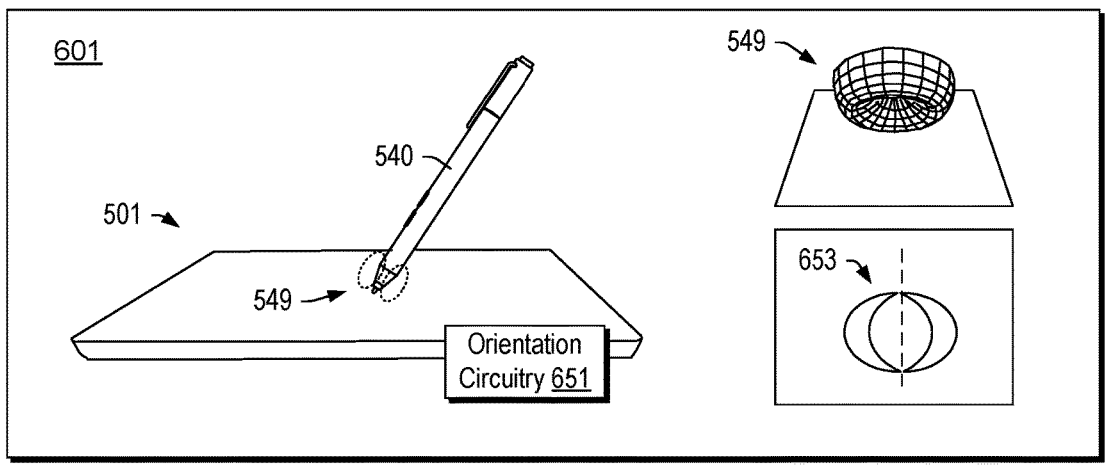
FIG. 6 is a series of diagrams of example arrangements of circuitry.
Figure 6:
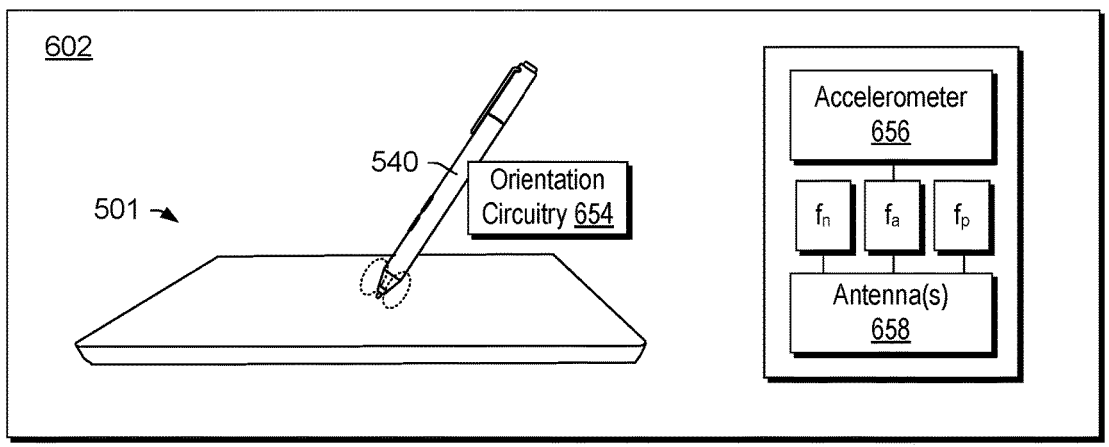
Figure 6:
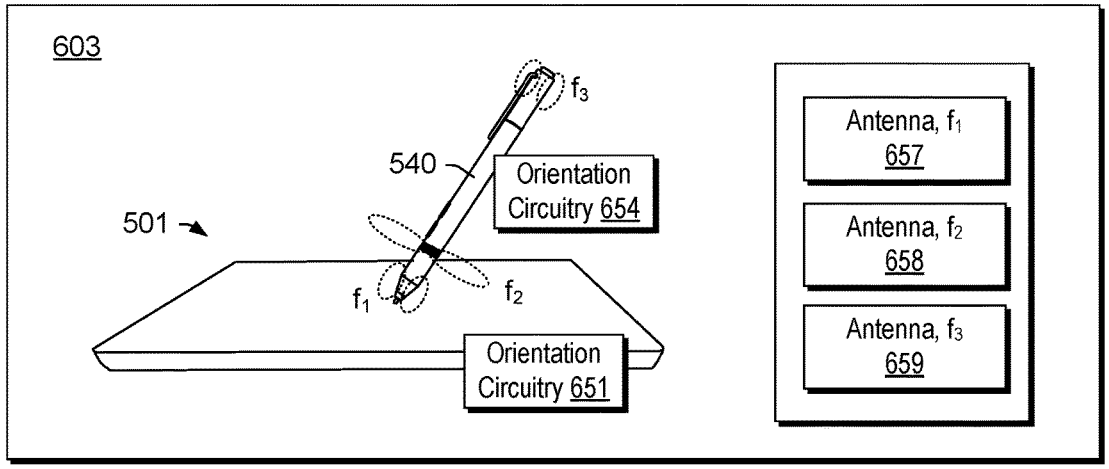

FIG. 6 shows example arrangements 601, 602, and 603 that include orientation circuitry 651 of the device 501 and/or orientation circuitry 654 of the stylus 540. In the arrangement 601, the stylus 540 may emit a field with a toroidal shape 549. In such an example, the device 501 can include a panel with sensors that form a plane that intersects the toroidal shape 549 of the field. In such an example, the field may be received by the sensors with a field shape distribution 653 (e.g., and an intensity distribution). As shown in FIG. 6, the shape may indicate an orientation of the stylus 540 (e.g., a direction of the longitudinal axis of the stylus 540).

In the arrangement 602, the stylus 540 may include one or more sensors such as, for example, one or more accelerometers. As an example, an accelerometer may be a single axis accelerometer or a multi-axis accelerometer. As an example, a sensor may be or include a gyroscope. As shown in the example of FIG. 6, an accelerometer 656 may generate a signal, which may be at a particular frequency or converted to a particular frequency. For example, FIG. 6 shows the accelerometer 656 associated with a generated signal $f_a$, which may be transmitted to one or more antennas 658. As an example, the one or more antennas 658 may be operatively coupled to circuitry that can emit signals. As an example, the one or more antennas 658 may emit a frequency or frequencies for a nib (e.g., $f_n$), one or more frequencies for an orientation sensor (e.g., $f_a$) and/or one or more frequencies for a pressure sensor (e.g., $f_p$). In such an example, the device 501 may receive one or more of the frequencies to, for example, determine nib positions, stylus orientation and pressure applied to a nib (e.g., as in contact with the device). As an example, an antenna may emit frequency and/or time based signals. For example, a signal or signals from a sensor or sensors of a stylus may be frequency encoded, time encoded, etc. As an example, a stylus may include multiplexing circuitry and a device may include de-multiplexing circuitry.

In the arrangement 603, the device 501 can include orientation circuitry 651 and the stylus 540 can include orientation circuitry 654. As an example, the orientation circuitry 654 of the stylus 540 may include multiple antennas such as an antenna 657 for emission of energy at a frequency $f_1$, an antenna 658 for emission of energy at a frequency $f_2$, an antenna 659 for emission of energy at a frequency $f_3$. As an example, the orientation circuitry 651 of the device 501 may receive energy emitted by one or more of the antennas 657, 658 and 659 of the stylus 540. In such an example, one antenna (e.g., the antenna 657) may emit energy that can be received by the device 501 to determine a nib position and another antenna (e.g., the antenna 658 or the antenna 659) may emit energy that can be received by the device 501 to determine a stylus orientation.

As an example, the device 501 can include active capacitive circuitry that can sense energy to determine nib position while the orientation circuitry 651 may sense energy to determine stylus orientation. As an example, such active capacitive circuitry may sense energy to determine a butt end position of a stylus. For example, the antenna 657 may emit energy proximate to a nib and the antenna 659 may emit energy proximate to a butt end where active capacitive circuitry may determine a position of a nib and a position of a butt end via receipt of such energy. As an example, active capacitive circuitry may distinguish a nib from a butt end based at least in part on one or more characteristics of emitted energy of a stylus.

As an example, the orientation circuitry 651 may be of lesser resolution than active capacitance circuitry. For example, the orientation circuitry 651 may include reception circuitry (e.g., an antenna or antennas) formed as a loop, a grid, a ring or rings, etc., which may optionally be disposed in a plane parallel to a display surface of the device 501. As an example, the orientation circuitry 651 may optionally receive energy emitted by the stylus 540 and determine an orientation such as, for example, a quadrant, to which a projection of the stylus 540 to a plane of the device 501 may lay.

As an example, in the arrangement 603, the orientation circuitry 654 of the stylus 540 may include BLUETOOTH™ communication circuitry and the orientation circuitry 651 of the device may include BLUETOOTH™ communication circuitry where, for example, the stylus 540 may be "paired" with the device 501 (e.g., according to a BLUETOOTH™ communication protocol).

Figure 7:
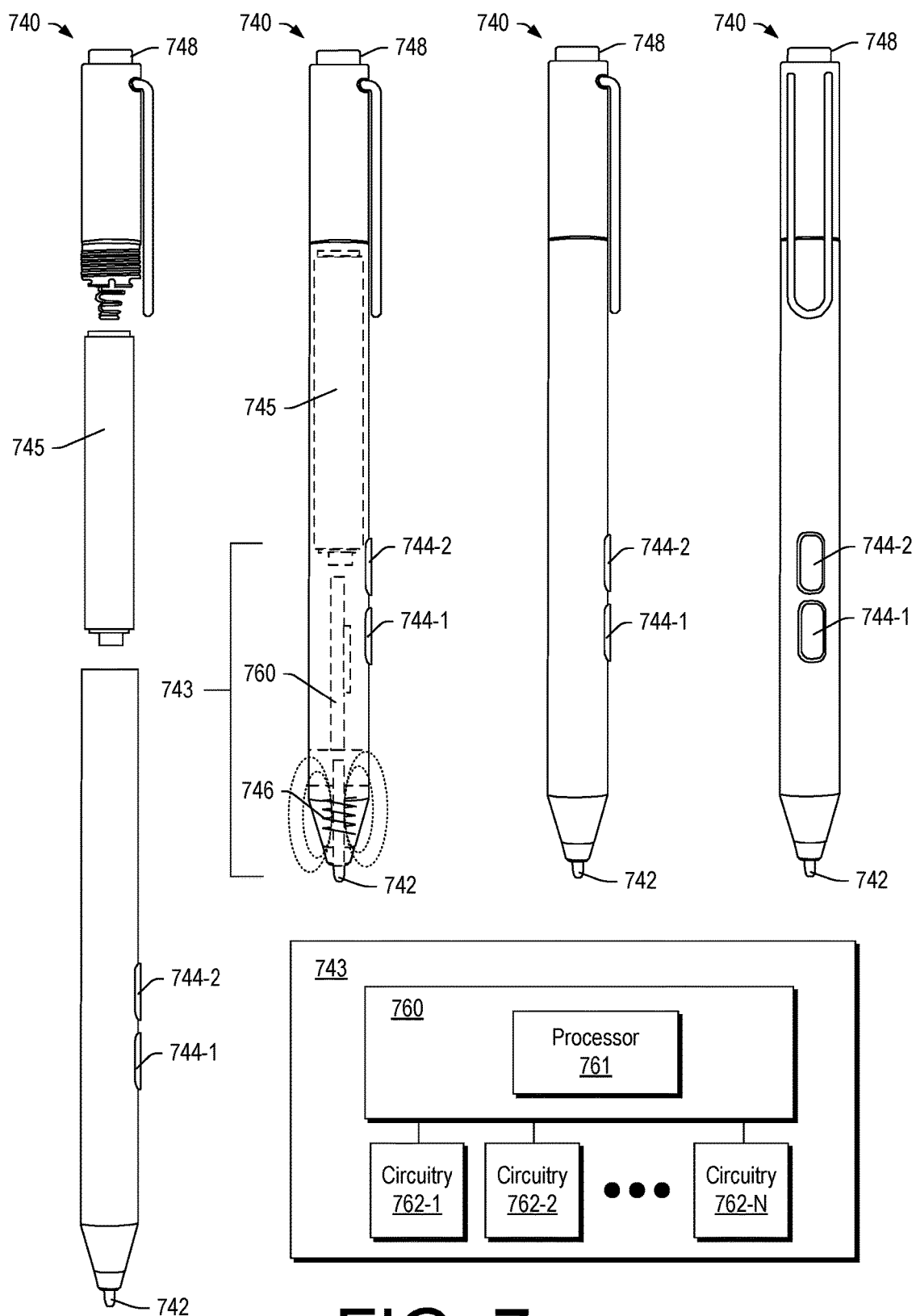
FIG. 7 is a series of diagrams of an example of a stylus.

FIG. 7 shows an example of a stylus 740 that includes a nib 742, circuitry 743, side buttons 744-1 and 744-2, one or more batteries 745, an antenna or antennas 746, and a butt end button 748. As shown in the example of FIG. 7, the stylus 740 may be separable to provide access to a chamber that can house the one or more batteries 745. For example, the stylus 740 may include two portions that form a joint where one portion includes male threads and the other portion includes matching female threads.

As shown in the example of FIG. 7, the nib 742 may include a nib shaft that can translate in a socket of the stylus 740. In such an example, pressure applied to the nib 742 may cause the nib shaft to translate where the circuitry 743 can sense the translation and output a signal that represents pressure applied to the nib 742 (e.g., a pressure level signal).

In the example of FIG. 7, the buttons 744-1, 744-2 and 748 may be operatively coupled to the circuitry 743. In such an example, actuation of one or more of the buttons 744-1, 744-2 and 748 may generate a signal or signals that the circuitry 743 can process, for example, to cause energy emission by the antenna or antennas 746 of the stylus 740. For example, the button 744-1, upon actuation, may generate a signal that corresponds to a function where the circuitry 743 can process the signal and energize the antenna or antennas 746 to emit energy with one or more characteristics indicative of the function. In such an example, the button 744-2, upon actuation, may result in emission of energy with one or more characteristics indicative of its function, which may differ from that of the button 744-1. Further, where the button 748 has an associated function, upon actuation, energy may be emitted with one or more characteristics indicative of its function. As an example, a characteristic of emitted energy may be a frequency characteristic, a timing characteristic, an amplitude characteristic, a spatial characteristic, etc.

As shown in the example of FIG. 7, the circuitry 743 may include a board 760 that includes a processor 761 such as, for example, an application-specific integrated circuit (ASIC). As an example, the board 760 may include a system-on-chip (SoC). For example, the board 760 may include the processor 761, memory (e.g., one or more of ROM, RAM, EEPROM, flash memory) and other circuitry.

As shown in the example of FIG. 7, the board 760 may be operatively coupled to circuitry 762-1, 762-2 and 762-N (e.g., where N may be zero or an integer greater than 2). As an example, a stylus may include one or more buttons with associated circuitry. As an example, circuitry may be or include a switch. For example, a switch may be a pressure sensitive switch, an optical switch, a mechanical switch, etc. As an example, the board 760 may include a bus where the circuitry 762-1, 762-2 and 762-N is operatively coupled to the bus. As an example, such a bus may be an I²C bus. In such an example, a button may include an address where, for example, actuation of the button generates a signal and an address (e.g., an identifier). In such an example, the processor 761 may associate a received button signal with a particular button and, for example, an associated function of the button (e.g., a function that depends at least in part on orientation of the stylus 740).

As an example, orientation circuitry may detect an orientation of a stylus with respect to a display and button circuitry may assign a function to at least one button of the stylus based at least in part on the orientation of the stylus. In such an example, circuitry such as the circuitry 743 may include button circuitry, for example, as may be part of the processor 761 and/or one or more of the circuitry 762-1, 762-2 and 762-N. As an example, assignment of a function to a button may occur locally (e.g., within a stylus itself) and/or may occur remotely (e.g., within a device). As mentioned, a data structure may be part of or associated with button circuitry where such a data structure may include entries that include functions and orientations. Where such a data structure includes information for a plurality of buttons of a stylus, a button may include a button ID in a button ID field where one of a plurality of functions may be assigned to that button ID based on a detected orientation of the stylus.

As an example, the button 748 may be operatively coupled to circuitry that can emit energy where receipt of the energy by a device causes the device to perform a function. As an example, consider an application "open" function. As an example, the button 744-2 may be operatively coupled to circuitry that can emit energy where receipt of the energy by a device causes the device to perform a function. As an example, consider a "right-click" function, for example, as in right-clicking a mouse. As an example, depending on an application being executed, actuation of the button 744-2 may result in a function that opens a menu, for example, to choose pen color, thickness, and/or other options. As an example, a "click and hold" of the button 744-2 may result in, for example, selection of text, etc. As an example, the button 744-1 may be operatively coupled to circuitry that can emit energy where receipt of the energy by a device causes the device to perform a function. As an example, consider an erase function. For example, consider a "hold down" of the button 744-1 where movement of the nib over an area instructs a device to erase content of that area.

As an example, a device can include hand rejection circuitry, for example, consider palm rejection circuitry. As an example, when a stylus is in proximity to a display, a device may trigger palm rejection circuitry. As an example, palm rejection circuitry may provide orientation information. For example, a region of a palm being "rejected" may be indicative of an orientation of a stylus; however, as it is possible to rest a palm while maneuvering a stylus to various angles, information from palm rejection circuitry may be used in conjunction with information from one or more other sources.

As an example, a user may become aware of proximity and nib recognition by a device via feedback. For example, when a nib is within a nib recognition distance, a marker may be rendered to a display at a position that corresponds to the position of the nib as best "recognized" by the device.

As an example, the stylus 740 of FIG. 7 may include BLUETOOTH™ connectivity circuitry (e.g., BLUETOOTH™ 4.0, etc.), an erase function for the side button 744-1, a right-click function for the side button 744-2 and an application initiation function for the butt end button 748. As an example, the stylus 740 may be about 10 mm in diameter and include a length of about 140 mm. As an example, a stylus may include a clip.

As mentioned, a method can include detecting orientation of a stylus with respect to a display and assigning a function to a button of the stylus based at least in part on the orientation. For example, one or more of the buttons 744-1, 744-2 and 748 of the stylus 740 may be assigned a function based at least in part on orientation of the stylus 740 with respect to a display of a device. For example, a stylus and a device with a display may include orientation circuitry (see, e.g., FIG. 6).

The stylus 740 may have a surface area of about 42 square centimeters (e.g., about 6.5 square inches). As shown, the buttons 744-1 and 744-2 are located with respect to a portion of the surface area that corresponds to an index finger tip region. For example, holding the stylus 740 a tip of an index finger may be rested in a region that is axially located between the button 744-1 and the nib 742. From this region, the tip of the index finger may be slide, lifted, etc. to at least in part cover the button 744-1 and/or the button 744-2. Thus, with respect to actuation by a tip of an index finger, the surface area of the stylus that is suitable for locating a button or buttons may be considered limited and a fraction of the total surface area of the stylus 740. For example, a region suitable for locating one or more buttons may be about one tenth of a total surface area of a stylus such as the stylus 740. Thus, for the stylus 740 two may be considered an ergonomically reasonable number for side buttons actuatable via a tip of an index finger. Where such buttons are fixed in their respective functions, the number of functions is equal to the number of buttons. For example, a stylus with two side buttons provides two fixed functions.

As an example, where orientation circuitry is included in a stylus and/or a device, the number of functions per button can be increased. In such an example, a button may be assigned a default function when in a "normal" handheld orientation and may be assigned another function when in a different handheld orientation. For example, consider the button 744-1 being assigned an erase function when the stylus 740 is in a normal handheld orientation (e.g., with a butt end of the stylus pointed toward a crease between a thumb and index finger) and being assigned another function when the stylus 740 is oriented in an alternative orientation (e.g., with the butt end of the stylus pointed away from the crease between the thumb and index finger). Further, in such an example, the button 744-1 may be in an orientation accessible by a thumb of a user's hand for actuation. For example, consider an "index finger on top" orientation to a "thumb on top" orientation. Such a change in orientation may be attained via pivoting of a stylus while being held between an index finger and a thumb.

As mentioned, an orientation may be defined with respect to an angle or angles. As an example, a user may orient a stylus to a particular angle or angles where a function may be assigned to one or more buttons based at least in part on such an angle or angles.

As an example, a function assignable to a button may be selected from a plurality of functions, which may be associated with a plurality of orientations. As an example, a function may be associated with an application. As an example, a function may be associated with an operating system. As an example, a function may be a short-cut.

As an example, based on stylus angle and/or position, one or more stylus buttons may be defined. In such an example, such definitions may be or include function definitions. In such an example, a function may be assigned to a button based at least in part on stylus angle and/or stylus position.

As an example, if a stylus angle is in a normal position and angle (e.g., or angles), a button can be defined to initiate a shortcut function. For example, clicking a cap button may initiate a user-defined stylus application. In such an example, where the stylus is oriented with an angle indicative of the stylus being upside down, then the cap button may be assigned an eraser function.

As an example, a method can include detecting orientation of a stylus with respect to a display and assigning a function to a button of the stylus based at least in part on the orientation. In such an example, where the stylus is initially in a nib down orientation, the button may be assigned an application initiation function (e.g., a short-cut function) and where the stylus is oriented in a nib up orientation, the button may be assigned an eraser function. For example, a method may include detecting a nib up orientation (e.g., or butt end down orientation) and assigning a butt end button an eraser function (e.g., changing the function of the button from a first function to a second function based at least in part on orientation of the stylus).

Figure 8:
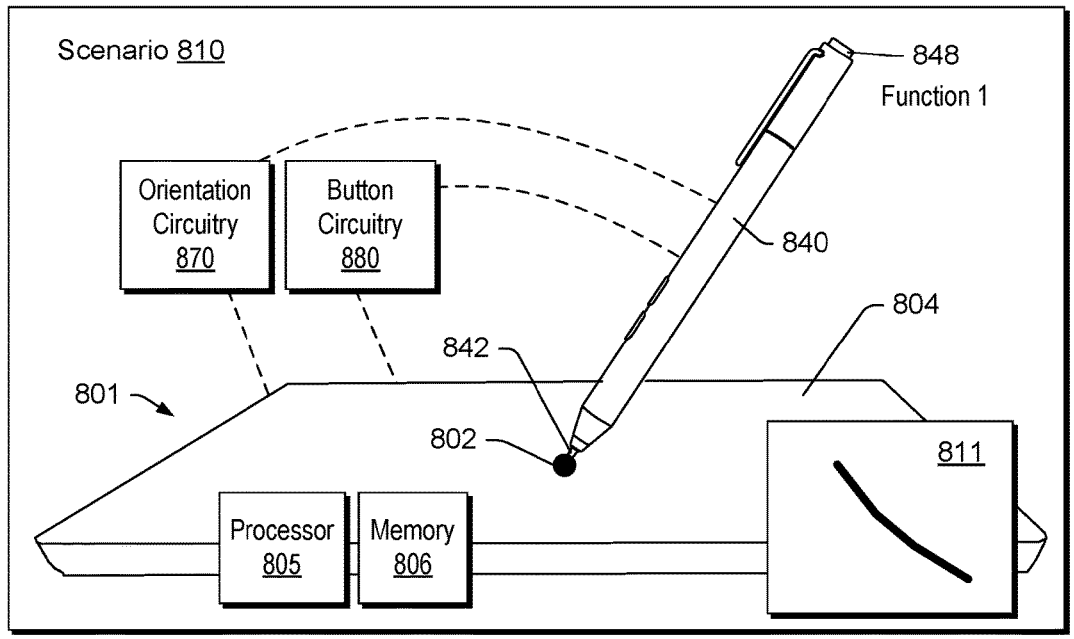
FIG. 8 is a series of diagrams of example scenarios that include an example of a device and a stylus.
Figure 8:
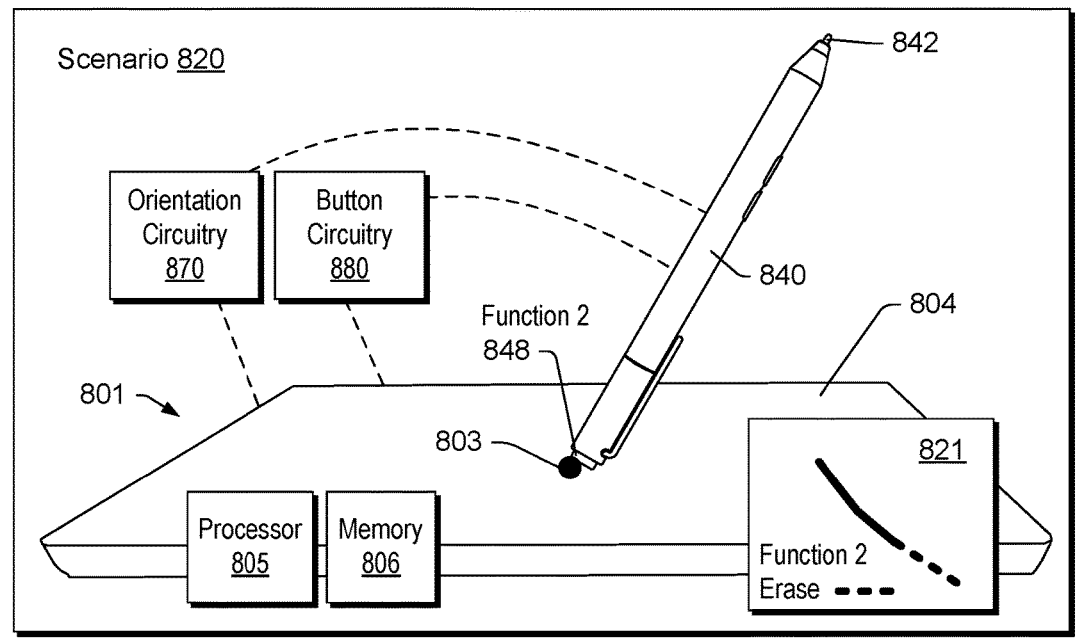

FIG. 8 shows an example scenario 810 and an example scenario 820 with respect to a device 801 and a stylus 840 where the device 801 includes a display 804, a processor 805 and memory 806 operatively coupled to the processor 805 and where, as a system, the device 801 and the stylus 840 include orientation circuitry 870 and button circuitry 880.

As shown, the stylus 840 includes a nib 842 and a button 848 where the button 848 may be assigned a first function (Function 1) and may be assigned a second, different function (Function 2). In the scenario 810, the nib 842 is in contact with the device 801 at a position 802 to generate digital ink, as illustrated in an inset diagram 811. In the scenario 820, the button 848 is in proximity to or in contact with the device 801 at a position 803 to erase at least a portion of the digital ink, as illustrated in an inset diagram 821. In such an example, the button 848 may be assigned an erase function responsive to detection of a butt end down orientation of the stylus 840. In such an example, orientation may be detected by orientation circuitry of the stylus 840, orientation circuitry of the device 801 or by orientation circuitry of the stylus 840 and orientation circuitry of the device 801. While an erase function is mentioned in the foregoing example, the button 848 may be assigned a different function. For example, consider a writing function for digital ink that may include a thickness or other characteristic that differs from a writing function for digital ink of the nib 842.

As an example, a system can include a processor; memory operatively coupled to the processor; a display operatively coupled to the processor; a stylus that includes a nib end and at least one button; orientation circuitry that detects an orientation of the stylus with respect to the display; and button circuitry that assigns a function to at least one of the at least one button of the stylus based at least in part on the orientation of the stylus.

Figure 9:
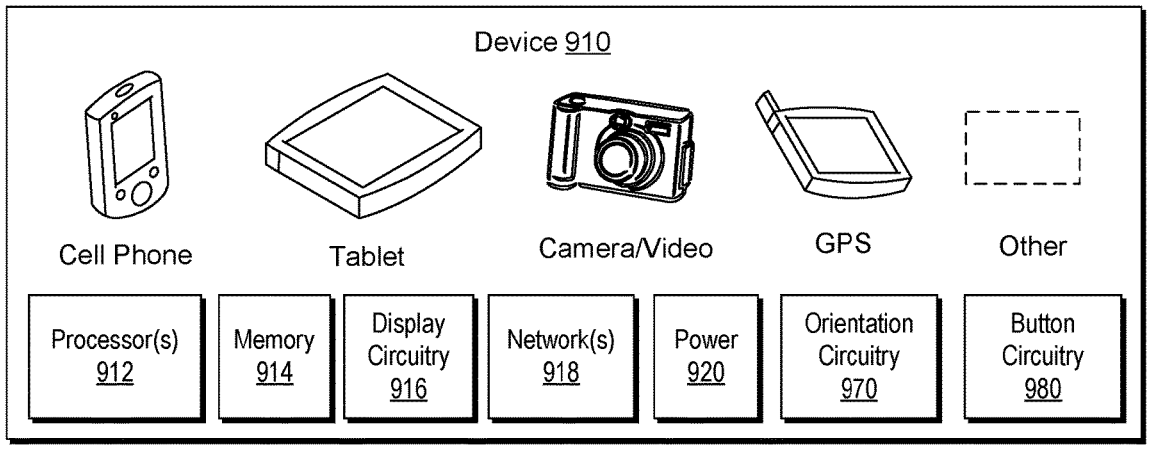
FIG. 9 is a series of diagrams of examples of devices and an example of a stylus.
Figure 9:
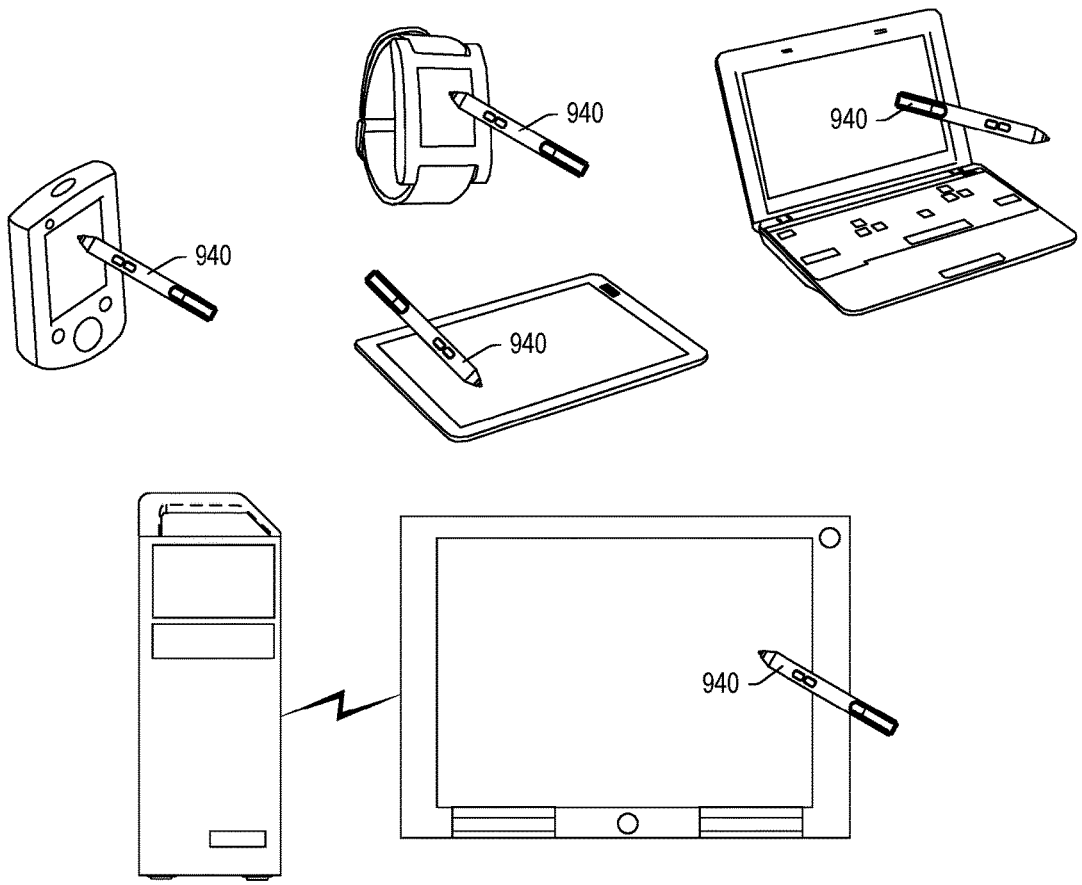

FIG. 9 shows an example of a device 910 and an example of a stylus 940. As an example, the device 910 may include one or more processors 912, memory 914, display circuitry 916, one or more network interfaces 918, power circuitry 920 (e.g., optionally including a power source such as a battery, etc.), orientation circuitry 970 and button circuitry 980. As shown, the device 910 may be configured, for example, as a watch, a phone, a tablet, a notebook, a desktop system, a camera, a GPS device or other device (e.g., operable to receive input via a stylus 940).

Various types of computing devices that include one or more processors, memory and a display may be characterized by one or more form factors. For example, various components of a computing device may have associated form factors (e.g., motherboard, chassis, etc.) and a computing device itself may have an associated form factor (e.g., notebook, tablet, etc.). As an example, a notebook computing device form factor may be specified as including an "A portion" (e.g., that includes a display) and a "B portion" (e.g., that includes a keyboard) where the two portions are coupled via one or more hinges and where each portion may be further specified by a length, a width and a height (e.g., or depth). As an example, a tablet computing device form factor may be specified by a length, a width and a height (e.g., or depth). As an example, a tablet computing device form factor may be referred to, at times, as a "pad" (e.g., or a "pad tablet", etc.). As an example, a watch computing device form factor may be specified with respect to a band, for example, such as a wrist band. As an example, such a device may be considered a wearable device.

As an example, a method can include detecting orientation of a stylus with respect to a display; and assigning a function to a button of the stylus based at least in part on the orientation. In such an example, the function of the button can depend at least in part on an orientation angle of the stylus with respect to the display. For example, a stylus can include a nib end where the orientation angle is within a range of orientation angles defined with the nib end of the stylus being the closest part of the stylus to the display.

As an example, a method can include detecting orientation of a stylus with respect to a display; assigning a function to a button of the stylus based at least in part on the orientation; detecting a different orientation of the stylus with respect to the display and assigning a different function to the button of the stylus based at least in part on the different orientation.

As an example, a stylus can include a nib end where a position of the nib end with respect to a display defines an origin of a coordinate system. In such an example, the coordinate system can include at least one of an azimuthal angle coordinate and an altitudinal angle coordinate.

As an example, a method can include determining an orientation of a display with respect to gravity and assigning a function to a button of a stylus based at least in part on the orientation of the display with respect to gravity. In such an example, the orientation of the display with respect to gravity defines at least in part a coordinate system. For example, a device can include one or more accelerometers, gyroscopes, etc. Such a device may determine how to render information to a display based at least in part on an orientation of the device with respect to gravity. For example, consider a portrait format and a landscape format for rendering of information to a display that depend on orientation of a device with respect to gravity. As an example, a stylus can include a nib end where a position of the nib end with respect to a display of a device defines an origin of a coordinate system and where the coordinate system may be defined at least in part by orientation of the device with respect to gravity.

As an example, a method may include determining a handedness based at least in part on orientation of a stylus with respect to a display. For example, in a normal writing orientation, a right-handed user may orient a stylus such that a nib is in contact with a surface of a display and a butt end is oriented toward a lower right corner of the display; and a left-handed user may orient a stylus such that a nib is in contact with a surface of a display and a butt end is oriented toward a lower left corner of the display. As an example, a method can include selecting a range of azimuthal orientation angles based at least in part on the handedness.

As an example, a method may include detecting orientation of a stylus with respect to a display via at least circuitry of the display and/or circuitry of the stylus.

As an example, a method can include assigning a function to a button of a stylus from a plurality of functions where each of the functions is associated with at least one distinct orientation of the stylus with respect to a display.

As an example, a system can include a processor; memory operatively coupled to the processor; a display operatively coupled to the processor; a stylus that includes a nib end and at least one button; orientation circuitry that detects an orientation of the stylus with respect to the display; and button circuitry that assigns a function to at least one of the at least one button of the stylus based at least in part on the orientation of the stylus. In such an example, the function of the button can depend at least in part on an orientation angle of the stylus with respect to the display. As an example, an orientation angle may be within a range of orientation angles defined with a nib end of a stylus being the closest part of the stylus to a display.

As an example, one or more computer-readable storage media can include processor-executable instructions that instruct a computing device where the instructions include instructions to: detect orientation of a stylus with respect to a display; and assign a function to a button of the stylus based at least in part on the orientation. In such an example, the function of the button can depend at least in part on an orientation angle of the stylus with respect to the display. As an example, an orientation angle may be within a range of orientation angles defined with a nib end of a stylus being the closest part of the stylus to a display.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium or a machine-readable medium may be a storage device (e.g., a memory card, a storage disk, etc.) and referred to as a computer-readable storage medium or a machine-readable storage medium that is not a carrier wave (e.g., a non-transitory medium).

Figure 10:
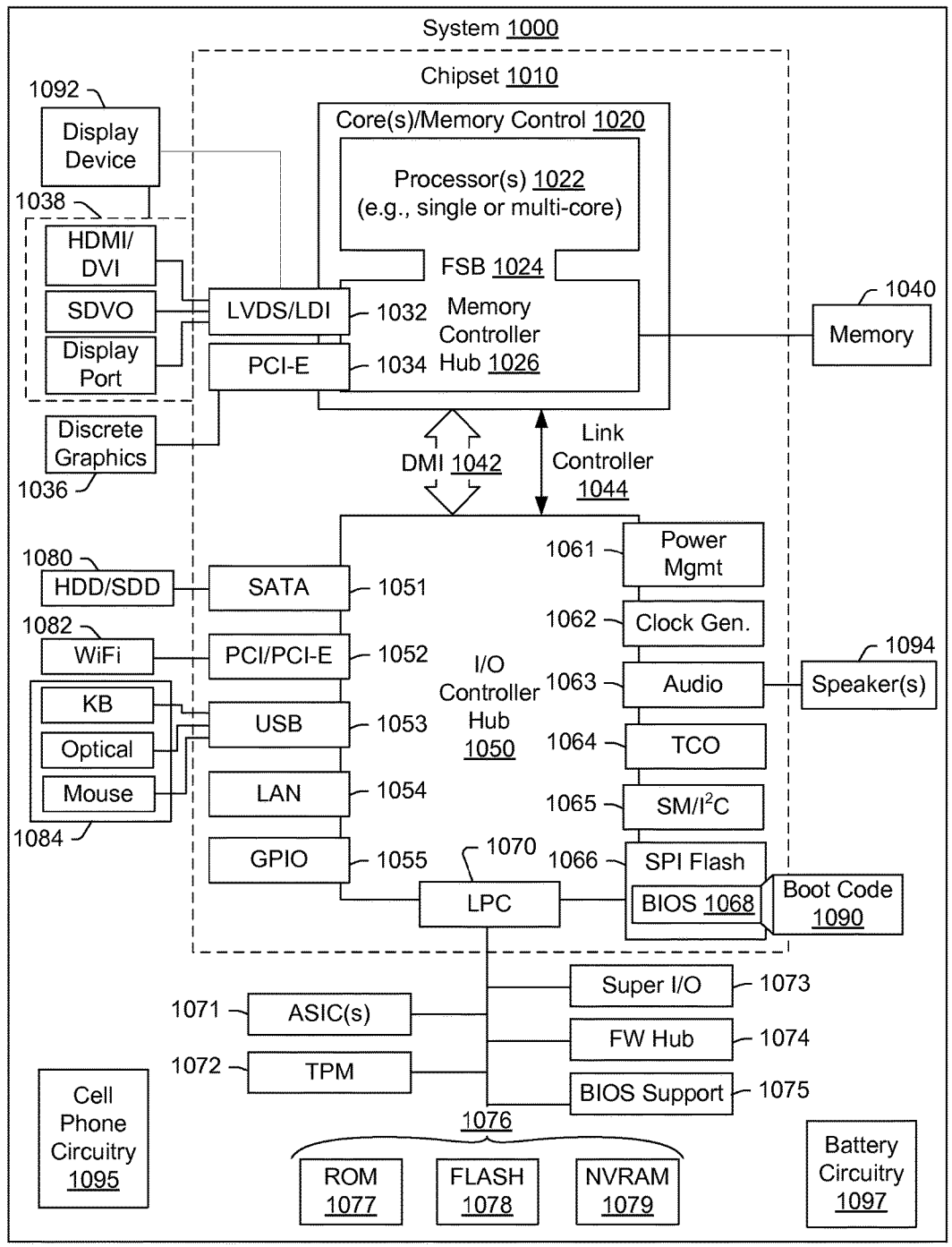
FIG. 10 is a diagram of an example of a system that includes one or more processors.

While various examples of circuits or circuitry have been discussed, FIG. 10 depicts a block diagram of an illustrative computing system 1000. As an example, the system 1000 may be a system of components that may be included in a device. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000. As described herein, a device (see, e.g., the device 101, the device 501, etc.) may include at least some of the features of the system 1000.

As shown in FIG. 10, the system 1000 includes a so-called chipset 1010. A chipset refers to a group of integrated circuits, or chips, that are designed to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture. As an example, a chipset may be configured as a platform controller hub (PCH), for example, the memory controller hub (MCH) 1026 may be considered a northbridge and the I/O controller hub (ICH) 1050 may be considered a southbridge where the MCH 1026 and the ICH 1050 may be components of the platform controller hub (PCH) (e.g., a PCH architecture).

As shown in FIG. 10, the memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory". As an example, one or more processors may include circuitry for memory access, for example, to access system memory.

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics (e.g., rendering of graphics to a display, etc.).

The I/O controller hub 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O controller hub 1050 may include integrated gigabit Ethernet controller lines multiplexed with a PCI-E interface port. Other network features may operate independent of a PCI-E interface.

The interfaces of the I/O controller hub 1050 provide for communication with various devices, networks, etc. For example, the SATA interface 1051 provides for reading, writing or reading and writing information on one or more drives 1080 such as HDDs, SDDs or a combination thereof. The I/O controller hub 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, a touchpad, mice and various other devices (e.g., cameras, phones, storage, media players, etc.). On or more other types of sensors may optionally rely on the USB interface 1053 or another interface (e.g., I$^2$C, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068.

Again, as described herein, a satellite, a base, a server or other machine may include fewer or more features than shown in the system 1000 of FIG. 10. Further, the system 1000 of FIG. 10 is shown as including cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I$^2$C interface (see, e.g., the SM/I$^2$C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   detecting orientation of a stylus with respect to a display;
   while a button actuation signal of a pressure actuatable button of the stylus is not being received, assigning a function to the button based at least in part on the orientation, wherein the assigning comprises assigning the function from a plurality of different types of functions assignable to the button wherein each of the different types of functions is associated with at least one distinct orientation of the stylus with respect to the display; and
   activating the assigned function responsive to receipt of the button actuation signal.

2. The method of claim 1, wherein the function of the button depends at least in part on an orientation angle of the stylus with respect to the display.

3. The method of claim 2, wherein the stylus comprises a nib end and wherein the orientation angle is within a range of orientation angles defined with the nib end of the stylus being the closest part of the stylus to the display.

4. The method of claim 1, further comprising detecting a different orientation of the stylus with respect to a display and, while the button actuation signal of the button is not being received, assigning one of the different types functions to the button based at least in part on the different orientation.

5. The method of claim 1, wherein the stylus comprises a nib end and wherein a position of the nib end with respect to the display defines an origin of a coordinate system.

6. The method of claim 5, wherein the coordinate system comprises at least one member of a group consisting of an azimuthal angle coordinate and an altitudinal angle coordinate.

7. The method of claim 1, further comprising determining an orientation of the display with respect to gravity and assigning the function to the button based at least in part on the orientation of the display with respect to gravity.

8. The method of claim 7, wherein the orientation of the display with respect to gravity defines at least in part a coordinate system.

9. The method of claim 8, wherein the stylus comprises a nib end and wherein a position of the nib end with respect to the display defines an origin of the coordinate system.

10. The method of claim 1, further comprising determining a handedness based at least in part on the orientation of the stylus with respect to the display.

11. The method of claim 10, further comprising selecting a range of azimuthal orientation angles based at least in part on the handedness.

12. The method of claim 1, wherein the detecting orientation comprises detecting orientation via at least one member of a group consisting of circuitry of the display and circuitry of the stylus.

13. The method of claim 1, wherein the detecting orientation comprises detecting orientation via circuitry of the stylus.

14. A system comprising:
    a processor;
    memory operatively coupled to the processor;
    a display operatively coupled to the processor;
    a stylus that comprises a nib end and at least one pressure actuatable button;
    orientation circuitry that detects an orientation of the stylus with respect to the display;
    button circuitry that, while a button actuation signal of a button of the at least one pressure actuatable button is not being received, assigns a function to the button based at least in part on the orientation of the stylus wherein the function is assigned as one of a plurality of different types of functions assignable to the button wherein each of the different types of functions is associated with at least one distinct orientation of the stylus with respect to the display; and
    circuitry that activates the assigned function responsive to receipt of the button actuation signal.

15. The system of claim 14, wherein the function of the button depends at least in part on an orientation angle of the stylus with respect to the display.

16. The system of claim 15, wherein the orientation angle is within a range of orientation angles defined with the nib end of the stylus being the closest part of the stylus to the display.

17. One or more non-transitory computer-readable storage media comprising processor-executable instructions that instruct a computing device wherein the instructions comprise instructions to:
- detect orientation of a stylus with respect to a display;
- while a button actuation signal of a pressure actuatable button of the stylus is not being received, assign a function to the button based at least in part on the orientation wherein the function is assigned as one of a plurality of different types of functions assignable to the button wherein each of the different types of functions is associated with at least one distinct orientation of the stylus with respect to the display; and
- activate the assigned function responsive to receipt of the button actuation signal.

18. The one or more non-transitory computer-readable storage media of claim 17, wherein the function of the button depends at least in part on an orientation angle of the stylus with respect to the display.

19. The one or more non-transitory computer-readable storage media of claim 18, wherein the orientation angle is within a range of orientation angles defined with the nib end of the stylus being the closest part of the stylus to the display.

* * * * *